US009488903B1

(12) United States Patent
Veras de Souza

(10) Patent No.: US 9,488,903 B1
(45) Date of Patent: Nov. 8, 2016

(54) SILHOUETTE ZOETROPE

(71) Applicant: Christine Veras de Souza, Belo Horizonte (BR)

(72) Inventor: Christine Veras de Souza, Belo Horizonte (BR)

(*) Notice: Subject to any disclaimer, the term of this patent is extended or adjusted under 35 U.S.C. 154(b) by 0 days.

(21) Appl. No.: 15/195,270

(22) Filed: Jun. 28, 2016

Related U.S. Application Data

(60) Provisional application No. 62/191,754, filed on Jul. 13, 2015.

(51) Int. Cl.
G03B 21/14 (2006.01)
G03B 25/00 (2006.01)

(52) U.S. Cl.
CPC ..................... *G03B 25/00* (2013.01)

(58) Field of Classification Search
CPC .................................................. G03B 25/00
USPC ................. 352/50, 54, 87, 101, 102
See application file for complete search history.

(56) References Cited

U.S. PATENT DOCUMENTS

| 29,430 | A | | 7/1860 | Ames | |
| 64,117 | A | * | 4/1867 | Lincoln | G03B 21/32 352/101 |
| 697,907 | A | | 4/1902 | Wilder, Jr. | |
| 972,344 | A | * | 10/1910 | Davis | G03B 21/32 352/101 |
| 1,014,365 | A | * | 1/1912 | Bourgin | G03B 21/32 352/101 |
| 1,214,636 | A | * | 2/1917 | Zinn | G03B 21/32 352/101 |
| 1,804,260 | A | | 5/1931 | Kerr | |
| 1,925,136 | A | * | 9/1933 | Conover | A63H 33/22 229/5.5 |
| 2,350,733 | A | | 6/1944 | Drotning | |
| D180,372 | S | | 5/1957 | Morgan | |
| 2,876,570 | A | | 3/1959 | Swarbrick | |
| 2,959,872 | A | | 11/1960 | Rodgers | |
| 2,985,057 | A | | 5/1961 | Morgan | |
| 3,624,691 | A | | 11/1971 | Robson et al. | |
| 3,694,062 | A | | 9/1972 | Kloenig | |
| 3,700,880 | A | | 10/1972 | Smith | |
| 3,745,966 | A | | 7/1973 | Seager | |

(Continued)

OTHER PUBLICATIONS

Barsamian, Gregory, Feral Fount, American Museum of the Moving Image, New York, NY, 1996, website: http://gregorybarsamian.com/archive/Feral%20Font.html#Feral, Jun. 20, 2016.

(Continued)

*Primary Examiner* — William C Dowling
(74) *Attorney, Agent, or Firm* — Thomas P. O'Connell; O'Connell Law Firm

(57) ABSTRACT

An animation device for producing the perception of animation within a slotted cylinder. The animation device has a rotatable platform, and a slotted cylinder with wall segments at least partially separated by longitudinal slots retained to rotate concentrically with the platform. Images, such as two-dimensional or three-dimensional figures, are retained to rotate with the platform along a circumference substantially concentric with but greater than the circumference of the slotted cylinder whereby the slotted cylinder is disposed radially inward of the images. The images, which can be sequential, could be retained by elongate support members, by an image cylinder, or by any other support. When the platform is rotated, an observer looking through the slots in the slotted cylinder can perceive an animation of the plurality of images within the slotted cylinder. Multiple, separate pluralities of images can be retained, potentially along different circumferences, to produce distinct animations.

20 Claims, 10 Drawing Sheets

(56) References Cited

U.S. PATENT DOCUMENTS

| | | | |
|---|---|---|---|
| 3,951,529 A | 4/1976 | Gandia | |
| 3,961,434 A | 6/1976 | Sampson | |
| 4,085,932 A | 4/1978 | Hamano | |
| 4,307,528 A | 12/1981 | Dewees et al. | |
| 5,760,874 A | 6/1998 | Rudnick | |
| 5,870,170 A | 2/1999 | Pope | |
| 5,901,484 A | 5/1999 | Seder | |
| 5,905,564 A * | 5/1999 | Long | G03B 25/00 352/101 |
| 6,097,468 A * | 8/2000 | Muehlenhard | A63H 33/22 352/101 |
| 6,286,873 B1 | 9/2001 | Seder | |
| 6,385,875 B1 | 5/2002 | Santorsola | |
| 6,647,651 B2 | 11/2003 | Cutright | |
| 6,781,761 B2 | 8/2004 | Raymond | |
| 6,886,280 B2 | 5/2005 | Spodek et al. | |
| 7,151,541 B2 | 12/2006 | Seder | |
| 7,331,132 B1 | 2/2008 | Seder | |
| 7,940,371 B2 | 5/2011 | Barnett et al. | |
| 8,373,842 B1 | 2/2013 | Seder | |
| 2002/0105808 A1 | 8/2002 | Ting Yup | |
| 2008/0129963 A1 | 6/2008 | Hohl | |
| 2009/0141241 A1 | 6/2009 | Buyssens | |
| 2016/0184730 A1 * | 6/2016 | Seder | A63H 3/04 446/236 |

OTHER PUBLICATIONS

Brand, Bill, Masstransiscope, Brooklyn, NY, 1980, website: https://masstransiscope.wordpress.com/about, Jun. 20, 2016.

Yamashita, Kumi, Shadow Dialogue, 1999, website: https://vimeo.com/8015989, Jun. 20, 2016.

Ryusuke, Ito, Discovery of Motion Picture, 2006, website: https://www.youtube.com, Jun. 20, 2016.

Collishaw, Mat, All Things Fall, 2014, website: http://www.factum-arte.com/pag/636/All-things-Fall, Jun. 20, 2016.

Dyer, Eric, Modem Master of the Zoetrope, 2014, website: https://vimeo.com/114912808, Jun. 20, 2016.

Penttila, Kaisa, Garbage Whirl, Flatpack Film Festival, Birmingham City University's Parkside Campus, Birmingham, England, 2015, website: http://flatpackfestival.org.uk/event/the-amusement-park-2, Jun. 20, 2016.

Meierding, Stephen, 2013, website: http://thecreatorsproject.vice.com/blog/this-machine-from-180-ad-can-stil . . . , Jun. 20, 2016.

Lawrey, David and Jaki Middleton, The sound before you make it, 2005, website: http://www.wayback.net.au/the$_{13}$ sound$_{13}$ before$_{13}$ you$_{13}$ make$_{13}$ it1.php, Jun. 20, 2016.

Hewis, Mark Simon, The Life Size Zoetrope, 2007, website: http://www.marksimonhewis.com/Isz/, Jun. 20, 2016.

Kumao, Heidi, Cinema Machines, 1991, website: http://heidikumao.net/cinema-machines-2/, Jun. 20, 2016.

Fairfax, Jo, Calke Abbey zoetrope inspired pieces, 2011, website: http://jofairfax.blogspot.co.uk/2011/08/calke-abbey-zoetrope-inspired-pi . . . , Jun. 20, 2016.

Boultbee, David, Bread Art, Zoetropes, 2013, website: http://breadartcollective.co.uk/#project_id=61&media_id=481&force=575, Jun. 20, 2016.

Hudson, Peter, Charon, Burning Man Festival, Black Rock City, NV, 2011, website: http://hudzo.com/zoetropes/charon/, Jun. 20, 2016.

Burmeister, Jamie, "Buzz," Modern Arts, Contemporary Fine Art Gallery, Omaha, NE website: http://www.modernartsmidtown.com/artists/Jamie Burmeister, Jun. 20, 2016.

Cummins, Rebecca and Rusty Oliver, Velo-troupe, 2010, Cummins Selected Works 2003-2013, University of Washington, Seattle, WA, CumminsCatalogue2003-2013.pdf, p. 54.

Passmore, Jacqueline, Bicycle Zoetropes, 2012, website: https://vimeo.com/73219335, Jun. 20, 2016.

Le Fevre, Jim, Holy Flying Circus Title Sequence, 2011, website: http://phonotropia.blogspot.com/2011/10/jim-le-fevre-holy-flying-circus-t . . . , Jun. 20, 2016.

Sony's World's Largest Zoetrope, BRAVIA-drome, Venaria, Italy, 2009, website: http://www.mymodemmet.com/profiles/blogs/sonys-braviadrome-is-worlds, Jun. 20, 2016.

Stella Artois Confections a Dazzling Zoetrope of Glasses to Raise Cash for Clean Water, 2016, website: http://www.adweek.com/adfreak/stella-artois-confections-dazzling-zoetro . . . , Jun. 20, 2016.

Pixar's Zoetrope and how animation works, website: http://thekidshouldseethis.com/post/17452504790, Jun. 20, 2016.

Dubosc, Alexandre, The Caketrope of Burton's Team, 2012, website: http://www.alexandre-dubosc.com/web3/the-caketrope-of-burtons-team-st . . . , Jun. 21, 2016.

Miyazaki, Hayao, Bouncing Totoro zoetrope, 2010, Studio Ghibli Museum, Tokyo, Japan, website: http://voyagesextraordinaires.blogspot.sg/2010/studio-ghibli-museum.html, Jun. 23, 2016.

Zoetrope, https://en.wikipedia.org/wiki/Zoetrope#3D_zoetropes, Jun. 23, 2016.

Animation Praxinoscope, www.scientificsonline.com/animation-praxinoscope.html web page, Edmund Scientific's, Tonawanda, NY, USA, May 3, 2011.

Gomorrans Praxinoscope, www.youtube.com, Gomorrans Praxinoscope from 'Giving Birth to Love' LP Side A, 2009, Gomorrans Social Aid & Pleasure Club.

Hasbro, Lite-Brite Spider-Man 3 Flash Art Neon Paint Spinner, www.hasbro.com website, Hasbro, Inc., Pawtucket, Rhode Island, USA.

Sanni-T, Handcrafted zoetrope of a figure skater doing a loop jump, website: www.sanni-t.com/zoetrope, Dec. 21, 2015.

Gary Aden, Lego Zoetrope, 2011 Maker Faire, website: www.youtube.com, Dec. 21, 2015.

Gary Aden, 3D Zoetrope, 2010 California State Fair, website: www.youtube.com, Dec. 21, 2015.

Crayola, LLC, Easton, Pennsylvania, Easy Animation Studio, 2015, website: www.crayola.com, Dec. 22, 2015.

University of the Arts London, London College of Fashion, Undergraduate, 2010, BA (hons), Technical Effects for Performance, Liffey Clement, praxinoscope close up, praxinoscope—BAC exhibition, website: http://showtime.arts.ac.uk/LiffeyClement, Dec. 21, 2015.

Science & Society Picture Library, Zoetrope, 1886, website: http://www.scienceandsociety.co.uk, Dec. 22, 2015.

* cited by examiner

SILHOUETTE ZOETROPE

FIELD OF THE INVENTION

The present invention relates generally to visual display devices and methods. More particularly and precisely, the present invention relates to the creation of the illusion of movement in a zoetrope-like rotational display of, for example, silhouette cutouts or three-dimensional objects thereby creating a spectral effect that produces the perception of movement without requiring stroboscopic light.

BACKGROUND OF THE INVENTION

As is illustrated in FIG. 1, a zoetrope 100 as taught by the prior art is a device wherein the perception of animation is achieved by successively revealing and obscuring a sequential series of individual, still images 108 in relation to an observer 200. A traditional zoetrope 100 is founded on a vertically positioned cylindrical outer wall 102. The outer wall 102 is perforated by a series of vertical viewing slots 104 that are regularly spaced around its circumference. An inner surface 106, which could, by way of example and not limitation, be a flexible strip of paper or other material or even the inner surface of the outer wall 102, is normally disposed interior to the wall 102 to support a series of individual images 108, each incrementally positioned relative to the last.

When the zoetrope 100 is rotated around an axis 110 passing through its geometric center and parallel to the viewing slots 104, the interior surface 106 of the wall 102 will be alternately perceived through the slots 104 and then obscured by the segments 112 of the outer wall 102 between the slots 104. Viewed through the rotating slots 104, each image 108 of the series of images 108 on the inner surface or wall 106 is briefly revealed as it reaches the same location where the preceding image 108 had been revealed.

When the zoetrope 100 is rotated at an appropriate speed, individual images 108 are revealed and obscured in rapid succession in relation to the positioned observer 200 such that the perception of animation is realized. So constructed and rotated, the zoetrope 100 creates a flickering effect wherein the observer 200 perceives illusory motion of the fixed images 108.

The apparent motion created by such zeotropes 100 according to the prior art was explained by scientists in the nineteenth century as being caused by a phenomenon referred to as persistence of vision. It was believed that, when still images, each slightly different, were displayed in a sequential order and shown in a certain flickering speed, our eyes and mind did not perceive them as individual images. The images were considered to have been superimposed one image into another, thus giving the impression of movement. While the historical theory related to persistence of vision is now considered by cognitive psychologists, neuroscientists, and media scholars to be inadequate, we are still able to see the resulting effect of those apparatuses as images in movement. In that sense, little has changed. The historical landmark established by the nineteenth-century scientists, while trying to develop not only plausible explanations but also practical devices that could provoke the right stimulus on our perception, is still acceptable.

In the zoetrope, the series of sequentially disposed images are normally shown in a cycle such that the first image continues the movement of the last image. This gives an impression of a never-ending loop. The animated cycle is important to creating the perception of a continuous moving effect as the cylinder spins. When this rule is not followed, a jump in the loop is perceived. The animated effect, although perhaps still seen, appears discontinuous and results in an incomplete movement.

Numerous inventors have contributed usefully to the art of zoetropes and other mechanical animation devices, but the precise origin of the zoetrope remains the subject of discussion. William George Homer (1786-1837) published his idea of a 'new instrument of optical illusion', which he called Daedaleum, in 1834. Ultimately, the Daedaleum became known as the zoetrope or 'wheel of life.' The zoetrope was described by the scholar Jonathan Crary as "a turning cylinder around which several spectators could view simultaneously a simulated action, often sequences of dancers, jugglers, boxers or acrobats." (Crary, 1990, p. 110.) While Horner's publication is among the earliest known regarding the zoetrope, others including Peter Mark Roget (1779-1869), Michael Faraday (1791-1867), Simon von Stampfer (1792-1864), and Joseph Plateau (1801-1883) achieved milestones in the field. Indeed, some sources even mention an early version of the zoetrope in China around 180 A.D. by Ting Huan. These many scientific discoveries have proven to be complementary, each improving the scientific understanding of optical animation devices. While zoetropes have been embodied as toys, it must be recognized that they also represent important developments in the understanding of animation and how the movement of static images is perceived by the human eye and, just as importantly, the human mind. It is possible to say that it was through the evolution of the apparent movement already created by these devices, associated with the development of photographic technology, that led to the invention of the movie camera and projector in the late nineteenth Century.

In the Western world, the nineteenth century was a fruitful period for devices producing animation through the relative movement of still images with one or more observers. Optical animation devices like the Thaumatrope and the Phenakistoscope started a trend that triggered many variations and developments among which the zoetrope is considered one of the most popular. While the Thaumatrope and the Phenakistoscope were intended to be seen only by one person at a time, the zoetrope permitted multiple spectators to be enchanted by the animated drawings simultaneously. Émile Reynaud (1844-1918) soon developed the Praxinoscope, which enabled animated movement to be seen more clearly since the images are seen through a faceted mirror rather than a cylinder with slots. Curiously enough, all these variations were able to co-exist and were quite popular until the invention of cinema. This period is historically known as Pre-Cinema and those devices considered now as part of the media archeology studies.

In contemporary times, the zoetrope has gained more technological variations, being used not only as a toy for home entertainment but also as an installation for artistic and entertainment purposes. One of its most famous modern variations uses a strobe light synchronized with a rotating structure in place of a slotted drum. The strobe light reproduces the flickering effect of the slots, and the illusion of movement can be seen clearly. Many artists, animators, and studios use this modern system to create their own zoetrope-like installation, using three-dimensional objects to enhance the astonishing effect of their work. Among the most notably are Gregory Barsamian, Matt Collishaw, Hayo Miyazaki, and Pixar Studios.

Gregory Barsamian is an Armenian-American artist, known as a sculptor of time. He developed a structure that resembles a zoetrope, powered by an engine that presents a transformation cycle of physical objects, sculptured sequentially, rather than drawings. The strobe light visually freezes the rotating structure thereby enabling the formed objects to be viewed. Using the same technique as Barsamian, Matt Collishaw has gained attention due to his artistic collaboration with Sebastian Burdon to create an extremely elaborate three-dimensionally printed zoetrope. Hayo Miyazaki, the animator and creator of Studio Ghibli, also created a zoetrope with a strobe light to bring his Totoro character to life. His use of the zoetrope was carried forward by John Lasseter from Pixar who created a similar animation system with his 'Toy Story' characters. While many devices, such as the zoetrope, rely on movement of static images, others exploit relative movement of the observer, such as along a railway or other conveyance. For instance, other artists, such as the North-American Bill Brand, made animated installations, called "masstransiscopes", with sequential panels disposed parallel to a train line and protected by boards with slits strategically cut out at established distances. The result is a colorful animation that takes first-time passengers by surprise when their train passes.

From the eighteenth and nineteenth centuries, moving images have enchanted audiences through phantasmagoria spectacles and optical devices, such as the flipbook, the thaumatrope, the phenakistoscope, the zoetrope, and the praxinoscope. Advances in digital technology now permit new forms of animation that exploit the same principles as early optical animation devices.

Many devices were first conceived for scientific reasons, such as to understand how our eyes work and to perceive the world around us. Then, the entertainment potential of these optical devices was exploited with the creation of toys.

Permitting the user to trick his or her own perception by manually operating the devices is an important characteristic. They combine amusement and experimentation, provoking astonishment and wonder through their apparent simplicity of operation. Thus, art and entertainment along with science and technology are connected by the same obsession for registering movement, which led to the development of devices to astonish and attract the public. The manipulation of the device itself leads people to participate in the process of generating an animated image.

The very progression of optical animation devices and systems, many building on those previous, evidences the continued need for advances in optical animation, with concomitant opportunities to teach further about visual and mental human perception and, to equal advantage, opportunities to delight and entertain.

SUMMARY OF THE INVENTION

With a knowledge of the history and present state of the art, the present inventor set forth with the basic object of providing an animation method and device that advances the art of optical animation while presenting users with visually interesting and entertaining animation.

A more particular object of the invention is to provide an optical animation system that is simple and elegant in structure and function.

A further object of the invention is to provide a zoetrope that represents a paradigm shift in optical animation devices.

A more particular object of embodiments of the invention is to provide a variation to the traditional zoetrope that departs from the teachings of the prior art by disposing the object to be animated outside of the structure, rather than inside, with the moving result seen inside the cylinder as an animated silhouette.

In certain manifestations of the invention, a further object is to exploit cutout designs and shadows in combination with zoetrope animation techniques.

These and further objects, advantages, and details of the present invention will become obvious not only to one who reviews the present specification and drawings but also to those who have an opportunity to experience an embodiment of silhouette zoetrope method and device disclosed herein in operation. However, it will be appreciated that, although the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects of the invention, an embodiment of the silhouette zoetrope, which may alternatively be referred to simply as an animation device, produces the perception of animation within a slotted cylinder by providing foundationally a platform rotatable about a longitudinal axis of rotation. A slotted cylinder is retained to rotate concentrically with the platform. The slotted cylinder has a peripheral wall with a circumference, and a plurality of slots are disposed in the peripheral wall to form a plurality of wall segments separated by the plurality of slots. A plurality of images are retained to rotate with the platform with the plurality of images disposed along a circumference substantially concentric with but greater than the circumference of the slotted cylinder. With that, the slotted cylinder is disposed radially inward of the plurality of images. Under this construction, when the platform is rotated, an observer looking through the slots in the slotted cylinder can perceive an animation, often referred to herein as a silhouette, of the plurality of images within the slotted cylinder.

Embodiments of the silhouette zoetrope can have a slotted cylinder 16 with an internal surface that is a first color and an outside surface that is a second, contrasting color. Moreover, the images could have external surfaces that are of a color, potentially the second color, contrasting with the inner surface of the slotted cylinder. By way of example, the first color could be white and the second color could be black or vice-versa.

The slots in the slotted cylinder may be longitudinally disposed in the cylinder. Moreover, in certain practices of the invention, the plurality of slots and the plurality of wall segments of the slotted cylinder can be substantially evenly spaced. While they need not necessarily be, the plurality of slots in the slotted cylinder and the plurality of images can be equal in number.

Within the scope of the invention, each of the plurality of images can take the form of a two-dimensional figure or a three-dimensional figure. The images can be sequentially disposed or configured, potentially to produce a perception of continuous animation. Under practices of the invention, each of the plurality of images could, by way of example, be retained by an elongate support member with a proximal portion retained by the platform and a distal portion that retains an image from the plurality of images. Additionally or alternatively, the plurality of figures could be retained by an image cylinder disposed concentrically with the slotted cylinder with the image cylinder having a circumference greater than the circumference of the slotted cylinder. The image cylinder could in particular embodiments be translucent or transparent.

Whether the images are retained by an image cylinder, by supports, or by some other method, the circle along which the images are retained can have a diameter approximately equal to the diameter of the slotted cylinder plus the radius of the slotted cylinder. With this, coherent, centered animation can be produced. The silhouette zoetrope can be of substantially any size so long as this proportion is preferably kept.

It is contemplated that a support stand can be provided with the platform being rotatably retained by the support stand. The slotted cylinder, the platform, and the images can be rotatable as a unit. Moreover, to permit optimal viewing of the animation, the slotted cylinder should have a height greater than a height of each of the plurality of images relative to the platform. Furthermore, each of the plurality of figures can be substantially aligned with one of the plurality of slots in the slotted cylinder.

Still further, it is contemplated that there could be multiple, separate pluralities of images producing distinct animations. For instance, there can be first and second pluralities of images retained to rotate with the platform with the first and second pluralities of images being separate. With that, when the platform is rotated, an observer looking through the slots in the slotted cylinder can perceive an animation of the first plurality of images within the slotted cylinder and an animation of the second plurality of images within the slotted cylinder distinct from the animation of the first plurality of images. While not necessarily so, the first plurality of images can be disposed along a first circumference, and the second plurality of images can be disposed along a second circumference different than the first circumference or the plurality of images could be positioned differently in the same large circumference. Even further, a background could be retained concentrically with the slotted cylinder thereby to render a more complete perception of animation with the animated plurality of images appearing to move in relation to the background.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

The silhouette zoetrope disclosed herein is subject to a wide variety of embodiments. However, to ensure that one skilled in the art will be able to understand and, in appropriate cases, practice the present invention, certain preferred embodiments of the broader invention revealed herein are described below and shown in the accompanying drawing figures.

Figure 1:
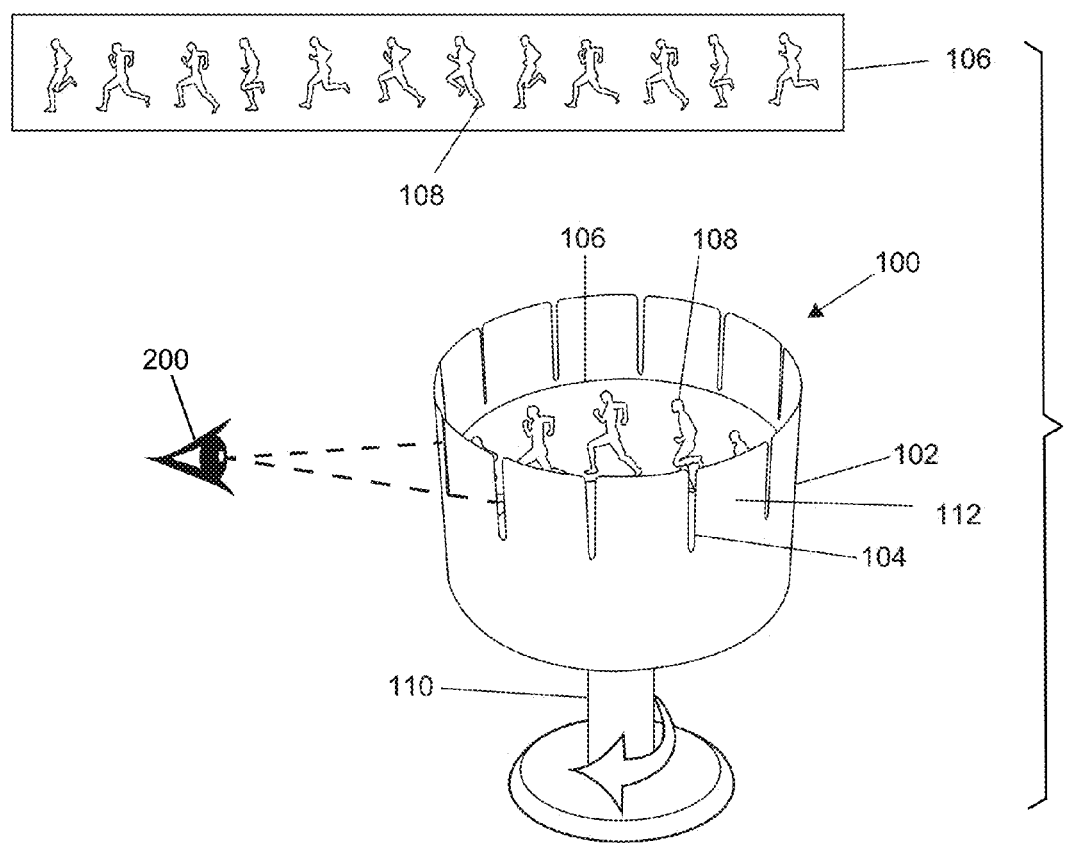
FIG. 1 is a perspective view of a zoetrope according to the prior art.

Turning more particularly to the drawings, a zoetrope as is common to the prior art is indicated generally at 100 in FIG. 1 while embodiments of silhouette zoetrope as disclosed herein are indicated at 10 in FIGS. 2 through 7. As discussed further herein below, silhouette zoetropes 10 embodying the present invention shift the paradigm of the original zoetrope 100 in that the animated object is shifted outside of the slotted animation cylinder rather than being inside the cylinder as the prior art has taught. The resultant animation of the disclosed cutouts or three-dimensional objects is depicted inside the cylinder as a spectral image. As a result, animation is no longer created with drawings on paper, but instead is taken outside, creating a stereoscopic effect of moving silhouettes placed into space, while the space internal to the slotted cylinder is in reality empty.

The disclosed silhouette zoetrope 10 represents a new approach to the concept of the traditional zoetrope 100. The illusion of movement created by the silhouette zoetrope 10 not only contributes to a better understand of how our brain perceives synthetic movement, but it also illustrates how the impression of an image placed into space can be created. A unique combination of what can be characterized as shadow puppets and a zoetrope enable the viewer to see a moving silhouette. The fields of optics, physics, neuroscience, and stereoscopy come together in this invention.

As discussed previously and again with reference to FIG. 1, a typical embodiment of a zoetrope 100 according to the prior art is founded on a vertically positioned cylindrical outer wall 102. The outer wall 102 is supported to rotate on an axis 110. A series of vertical viewing slits 104 are regularly spaced around the circumference of the outer wall 102 thereby dividing the wall 102 into a plurality of evenly spaced segments 112 with the viewing slots 104 there between. An inner surface 106, which could comprise a flexible strip of paper or other material or even the inner surface of the outer wall 102, is disposed interior to the wall 102. A series of individual, still images 108, each incrementally positioned relative to the last, is disposed on the inner surface 106 with the images 108 facing inwardly.

When the zoetrope 100 is rotated around the axis 110, the interior surface 106 of the wall 102 is alternately capable of being perceived by an observer 200 through the slots 104 and then obscured by the segments 112 of the outer wall 102 between the slots 104. The observer 200 thus perceives the drawings 108 spaced along the inner surface 106 of the wall 102 as animating with their sequential steps of movement being viewed in quick succession.

Figure 2:
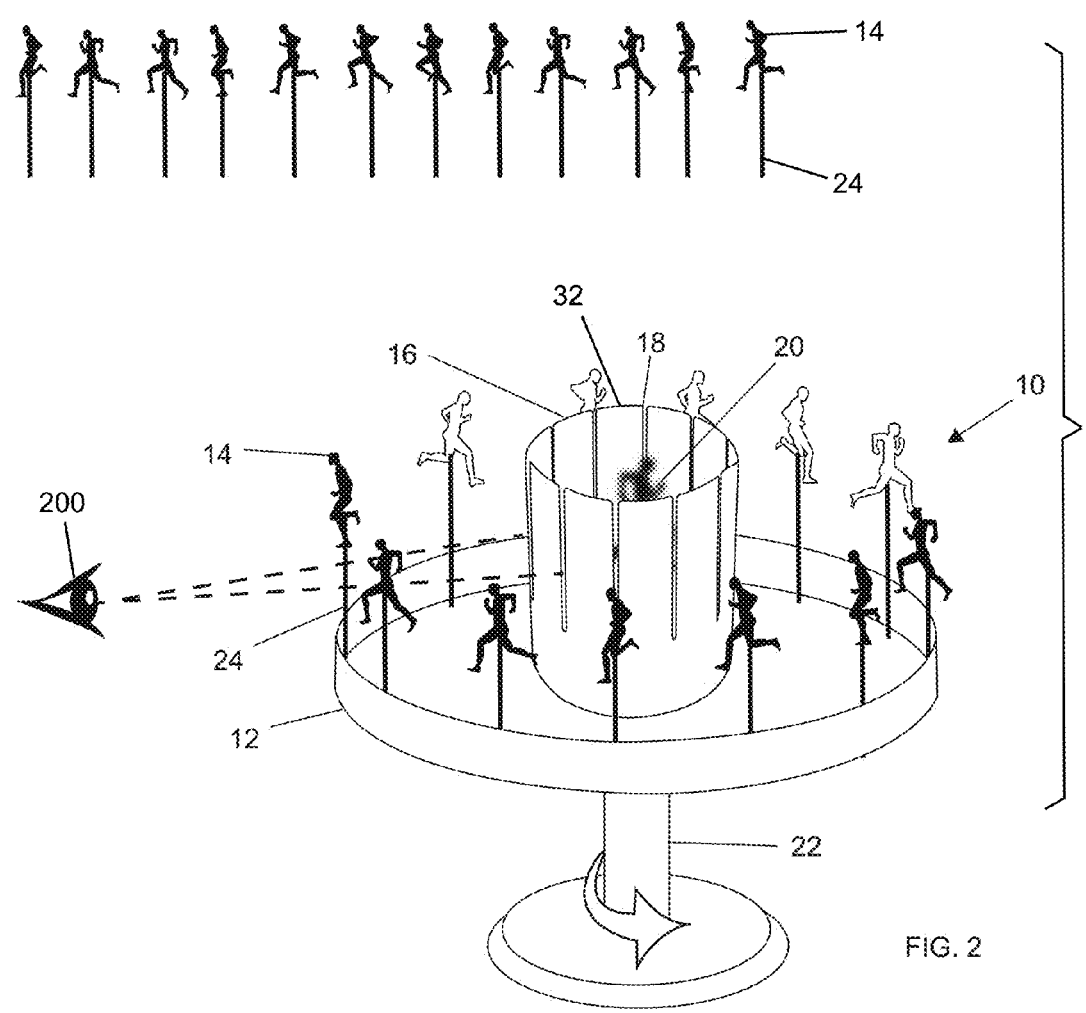
FIG. 2 is a perspective view of a silhouette zoetrope according to the present invention.

The structure and operation of the traditional zoetrope 100 will be contrasted with that of the silhouette zoetrope of the present invention, an embodiment thereof being first depicted in FIG. 2 where the silhouette zoetrope is indicated generally at 10. In the embodiment of FIG. 2, the silhouette zoetrope 10, instead of having drawings 108 on a paper strip 106 as with the traditional zoetrope 100, has two-dimensional or three-dimensional images or figure 14, which are also arranged sequentially. The figure 14 are disposed along a circumference. Each of the two-dimensional or three-dimensional figures 14 in this embodiment is retained by a support 24. The supports 24 could, by way of example and not limitation, comprise elongate members, and the figures 14 could be retained by the supports 24 in any effective manner, including by adhesive, fasteners, integral formation, or any other method. The supports 24 are, in turn, supported by a platform 12, and the platform 12 is rotatably retained by a support stand 22 to rotate about an axis concentric with the circumferentially spaced figures 14.

A slotted drum or cylinder 16 with a circumference smaller than the circumference along which the figure 14 are aligned is concentrically disposed radially inward of the figures 14. The cylinder 16 has a plurality of evenly spaced longitudinal slots 18 disposed therearound that divide the cylinder 16 into a plurality of wall segments 32. The number of slots 18 preferably matches the number of figures 14. The platform 12, the slotted cylinder 16, and the figures 14 are rotatable as a unit.

Figure 10:
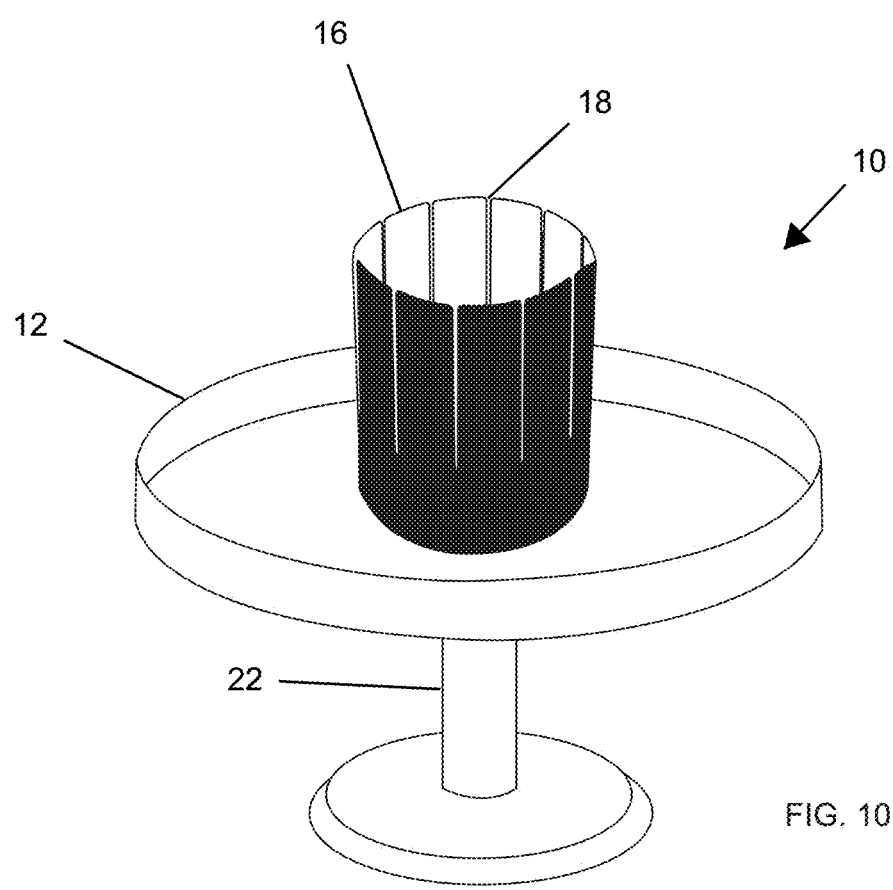
FIG. 10 is a perspective view of a slotted cylinder on a platform and support as disclosed herein with contrasting interior and exterior colors.

It has been discovered that the perception of animation of the sequence of images 14 is best achieved when the color of the inner surface of the slotted cylinder 16 is in contrast to the color of the outer surface of the slotted cylinder 16. An example of a slotted cylinder 16 with such contrasting colors is depicted in FIG. 10 with the series of figures 14 removed for clarity of illustration. Likewise, it will be recognized that the slotted drum 16 is depicted in, for instance, FIGS. 2 through 7 without emphasized contrasting colors or without colors as contrasting as may be preferred on the inner and outer surfaces. This is merely for clarity of illustration. In each case, it will be understood that the slotted drum 16 may preferably have contrasting colors as described herein and shown in FIG. 10. The outer surfaces of the images or figures 14 could also be of a color or colors contrasting with the inner surface of the slotted cylinder 16, whether that contrasting color be the same as or different than the contrasting color of the outer surface of the slotted drum 16. The contrasting colors permit a high contrast to be achieved between the external figures 14 and the inner surface of the slotted cylinder 16.

Embodiments of the silhouette zoetrope 10 can, by way of example and not limitation, have a slotted cylinder 16 with an internal surface that is a first color, namely white, and an outside surface that is a second, contrasting color, namely black. In such embodiments, the images 14 could, but need not necessarily, also have external surfaces that are black or otherwise contrasting with the inner surface of the slotted cylinder 16. Alternatively, although perhaps less preferably, the internal surface of the slotted cylinder 16 could be black with the contrasting outer surface being white. Other contrasting colors are possible and within the scope of the invention except as it might be expressly limited by the claims.

Whether the images 14 are retained by an image cylinder, by supports, or by some other method, the circle along which the images 14 are retained can have a diameter approximately equal to the diameter of the slotted cylinder 16 plus the radius of the slotted cylinder 16. With this, coherent, centered animation can be produced. The silhouette zoetrope 10 can be of substantially any size so long as this proportion is preferably kept.

When the zoetrope 10 is rotated, such as in the opposite direction of the positioned figures 14, the observer 200 can see inside the cylinder 16 when looking through the slots 18. When doing so, the observer 200 is presented with a moving representation 20 of the two-dimensional or three-dimensional figures 14. That moving representation can alternatively be referred to as a moving silhouette 20. With the observer perceiving a silhouetted moving representation of the figures 14 within the cylinder 16 rather than viewing actual images 108 on a surface 106, the silhouetted zoetrope 10 represents a marked differentiation from the animation concepts of the prior art as discussed above.

Notably, the resulting silhouette 20 or spectral image is seen as horizontally flipped in relation to the actual images or figures 14. For instance, where images 14 of a bird are positioned externally as flying towards the left, the internal spectral animated bird 20 will be seen flying towards the right. This again differentiates the silhouette zoetrope 10 from the traditional zoetrope 100. Moreover, it will be noted that, also unlike the traditional zoetrope 100, the resulting spectral image 20 created by the silhouette zoetrope 10 will tend to change its vertical position according to the head movement of the observer 200. Since the illusion effect only exists in the brain of the beholder, the images 14 can also be animated vertically if the observer moves his or her head up and down while still looking through the slotted cylinder 16.

As in the illustrated silhouette zoetrope 10 of FIG. 2, the cylinder 16 can be more elongate in proportion to the height of the images or figures 14 than the typical proportional height of the outer wall 102 in proportion to the height of the images 108 in prior art zoetropes 100. This increased height has been found to permit the moving silhouettes 20 exhibited during rotation of the silhouette zoetrope 10 to be perceived more easily by an observer 200.

In a further differentiation from the zoetropes 10 of the prior art, it has been found that the number of figures 14 need not be directly correlative to the number of wall segments 32 or slots 18. Fewer or more figures 14, whether in the form of two-dimensional or three-dimensional shapes, do not necessarily hinder the overall perception of animation. However, the illusion of having only one moving silhouette 20 animated in the middle of the cylinder 16 may be carried forth by placing the figure 14 exactly in front of a slot 18. If the figure 14 is disposed between slots 18, the illusion created inside the cylinder 16 will be of multiple animated silhouettes 20 moving simultaneously dislocated from the center of the cylinder 16, a further unique characteristic of the silhouette zoetrope 10 as disclosed herein.

Perception of one moving silhouette 20 is further promoted where the distance between each slot 18 is not so small that a single image 14 will be perceived simultaneously through multiple slots 18. Furthermore, differences in the width of the slots 18 will create a difference in the sharpness of the perceived animation 20. Larger slots 18 will create a more blurred and bright image, while thinner slots 18 will create a more focused animation 20 although perhaps not so bright. An ideal width of the slots 20 has been found to be between approximately 3 and 5 mm.

With respect to the size relationship between the disposition of the images 14 and the slotted cylinder 16, clarity of animation has been found to be best achieved where the images 14 are positioned externally to the slotted cylinder 16 by a distance equal to the radius of the slotted cylinder 16, although different size relationships may nonetheless produce perceivable animation and are within the scope of the invention. However, changes in these proportions may cause multiple animations 20 to be perceived rather than one, or such changes may distort the size of the animation 20.

It has further been found that the rotational speed of the silhouette zoetrope 10 need not be excessively rapid for the animation effect to be perceived. Even at relatively slow rotational velocities, the animated silhouette 20 can be seen inside the slotted cylinder 16. Nonetheless, the perception of animation of the images 14 may be better perceived by inducing increasing speeds, which can emphasize the animated effect by giving the impression that the images 14 slowly start to move, fly faster, and then progressively slow until the structure stops rotating.

Within the scope of the invention, other and enlarged platforms 12 and images can be added to the basic structure to create plural layers of animation, all interacting and moving inside the cylinder 20. Moreover, traditional zoetrope paper strips 106 as shown, for instance, in FIG. 1 could be added such that silhouettes 20 and drawings can appear to interact inside the cylinder 16.

Figure 3:
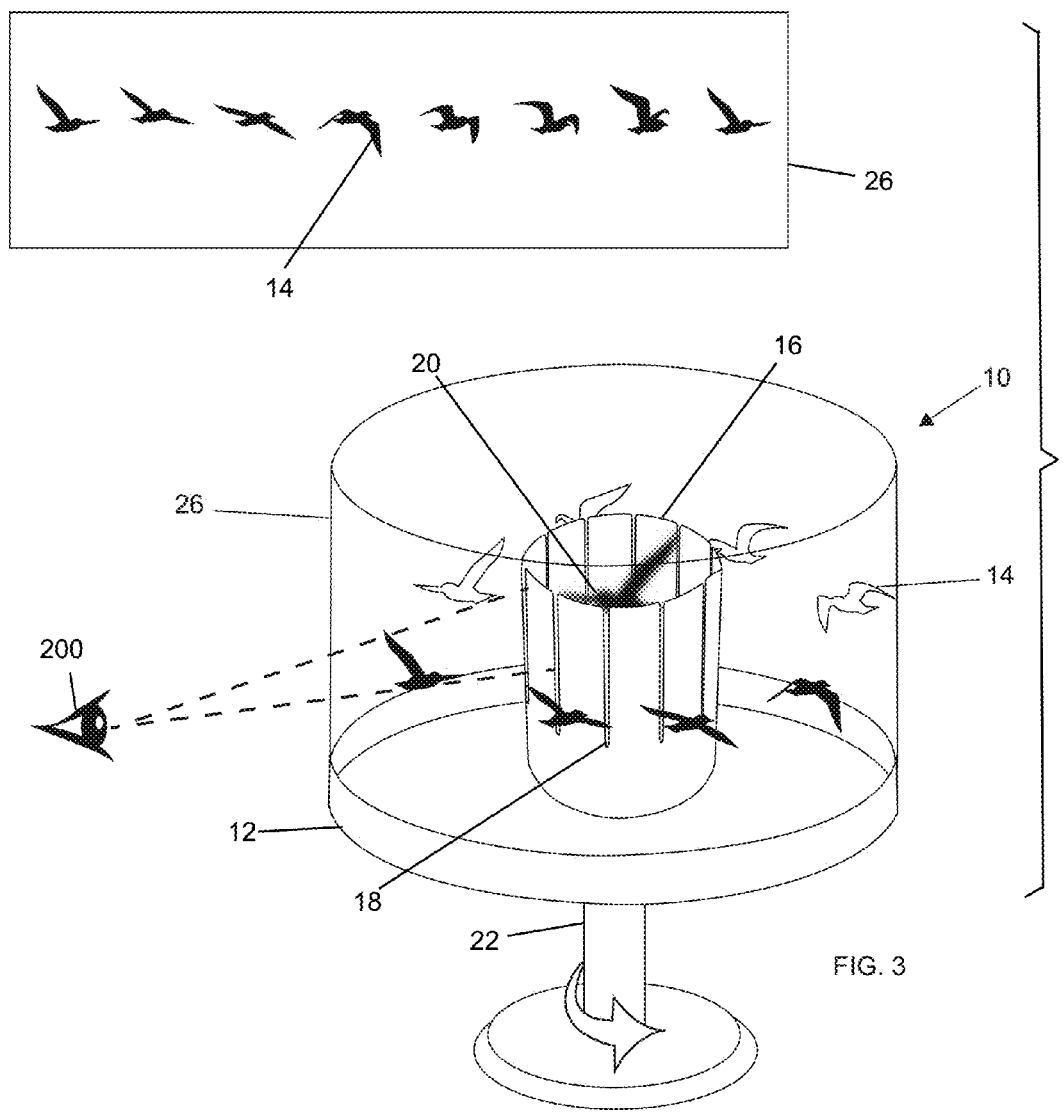
FIG. 3 is a perspective view of an alternative silhouette zoetrope as taught herein with a transparent outer strip or image cylinder.

An alternative embodiment of the silhouette zoetrope 10 is depicted in FIG. 3. There, the silhouette zoetrope 10 again has a rotatable platform 12 with a slotted cylinder 16 disposed to rotate concentrically therewith atop a support stand 22. Here, however, the figures 14 comprise two-dimensional images 14, and those images 14 are retained on a translucent or transparent image cylinder 26. The image cylinder 26, which has a circumference greater than that of the slotted cylinder 16, is retained to rotate concentrically with the slotted cylinder 16 and the platform 12 with the image cylinder 26 disposed radially outward of the cylinder 16. The image cylinder 26 could be pre-formed, or it could be created by forming a cylindrical shape from a panel of clear material. In any case, plural images 14 are retained by the transparent cylinder 26. The images 14 could, for example, comprise sequential images. The images 14 could be affixed to the cylinder 26, or they could be printed or otherwise formed directly on the image cylinder 26. When the platform 12, the cylinder 16, and the image cylinder 26 retaining the images 14 of the silhouette zoetrope 10 are rotated, the images 14 are perceived as moving silhouettes 20 inside the slotted cylinder 16 when perceived through the slots 18 by an observer 200.

Figure 4:
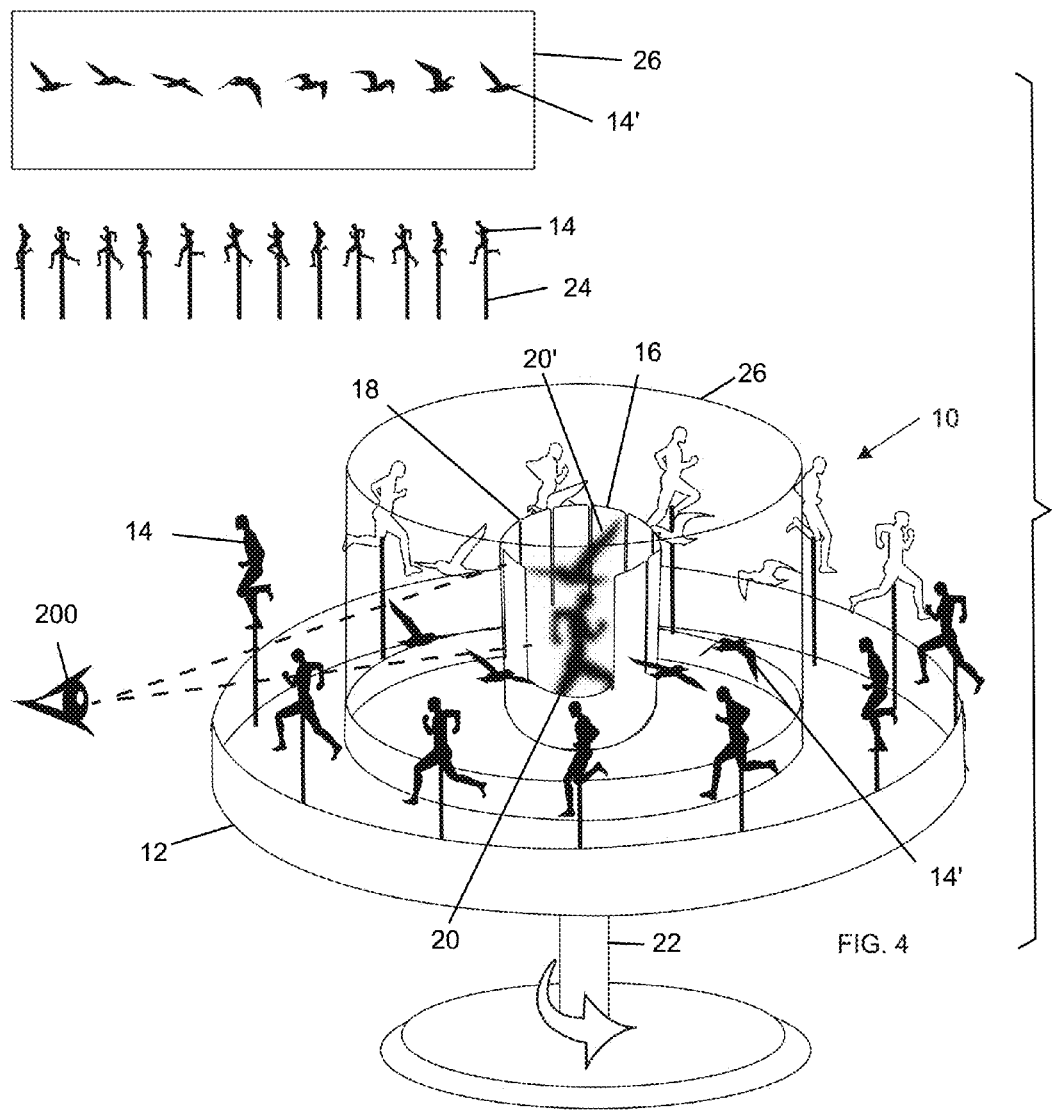
FIG. 4 is a perspective view of a further alternative silhouette zoetrope pursuant to the invention with combined layers.

Looking to the embodiment of the silhouette zoetrope 10 of FIG. 4, it will be understood that manifestations of the zoetrope 10 could be carried forth with multiple, separate series of images 14 and 14' to be animated as plural, separately moving silhouettes 20 and 20'. By way of example and not limitation, a first series of sequential cutout images 14 could be retained along a first circumference, such as by being retained by corresponding posts 24, relative to the rotatable platform 12. In addition, a second series of sequential images 14' can be retained to rotate with the platform 12 and the slotted cylinder 16, such as along a circumference radially spaced from the circumference of the first series of sequential images 14. For instance, the second series of sequential images 14' could be retained by a transparent image cylinder 26. Here, the first series of sequential images 14 depict a running man while the second series of sequential images 14' depict a flying bird. With that, the two series of sequential images 14 and 14' can be perceived as first and second silhouettes 20 and 20' within the slotted cylinder 16 during rotation of the platform 12 the slotted cylinder 16 of the silhouette zoetrope 10. It will be noted that, in FIG. 4, a portion of the zoetrope cylinder 16 is sectioned away for clarity of understanding.

In such embodiments, distortions in the image 14 positioned closer to the slotted cylinder 16 could be compensated by changing the size of the images 14. For example, smaller images 14 can be placed closer to the slotted cylinder 16 while larger images 14 will ideally be placed further away.

Figure 5:
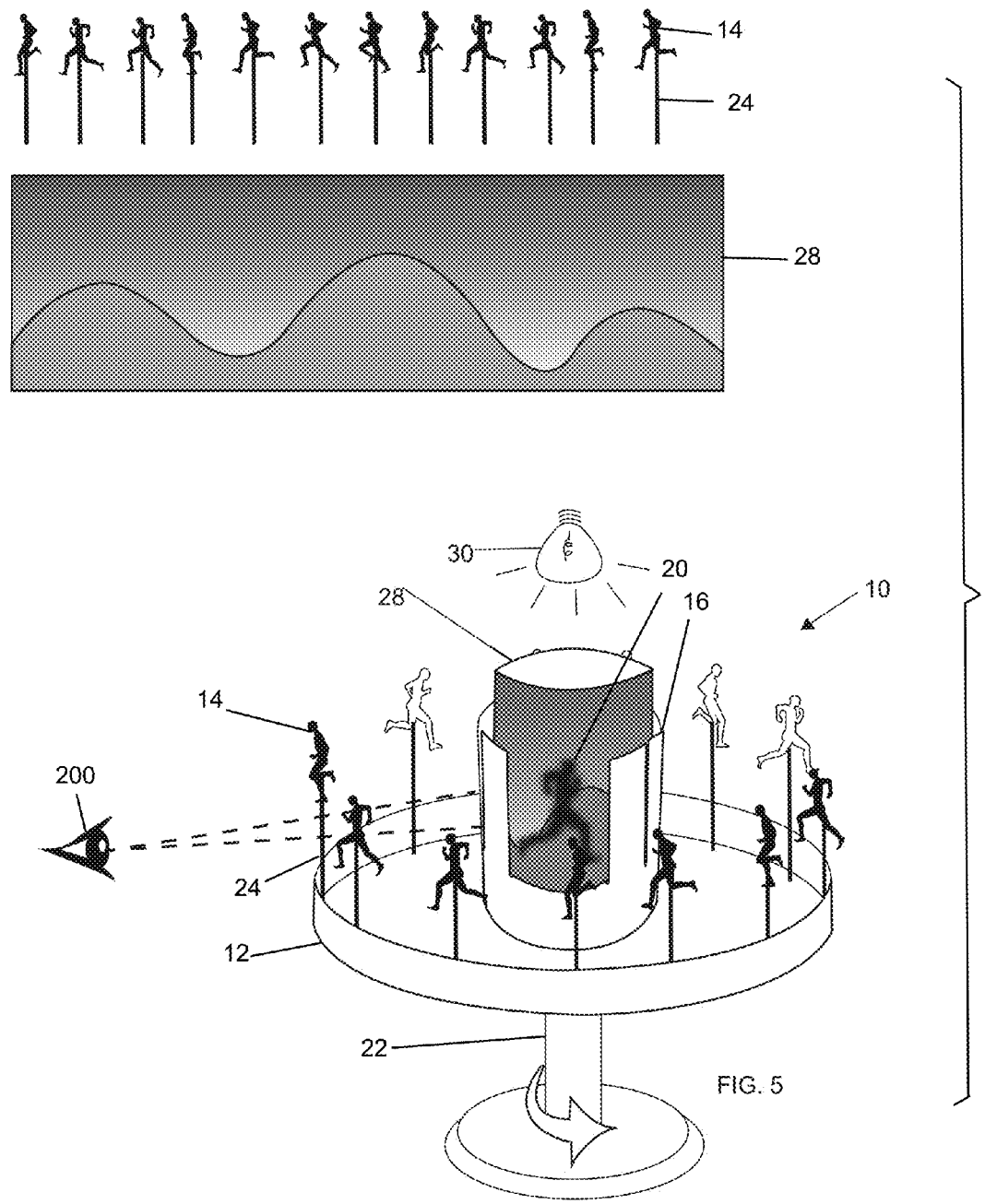
FIG. 5 is a perspective view of a silhouette zoetrope as disclosed herein with a color background.

As FIG. 5 illustrates, the silhouette zoetrope 10 could additionally include a background 28, which could include multiple colors. The background 28 could, for instance, be selectively or fixedly disposed inside the zoetrope slotted cylinder 16. Furthermore, illumination could be provided, such as from a light source 30. As one knowledgeable in the art will appreciate, the light source 30 could be of any effective type, whether an electrical light source, a flame, or some other direct or indirect source of light.

When the platform 12 of the silhouette zoetrope 10 is rotated thereby rotating the images 14 and the slotted cylinder 16, the images 14, which circumferentially surround the cylinder 16, are perceived as a moving silhouette 20 inside the cylinder 16 when seen by an observer 200 through the slots 18. With the colored background 28 placed inside the cylinder 16 and the light source 30 illuminated atop the cylinder 16, the silhouette 20 can be perceived as moving along the colored background 28. Again, a portion of the zoetrope cylinder 16 is sectioned away for clarity in FIG. 5.

Figure 6:
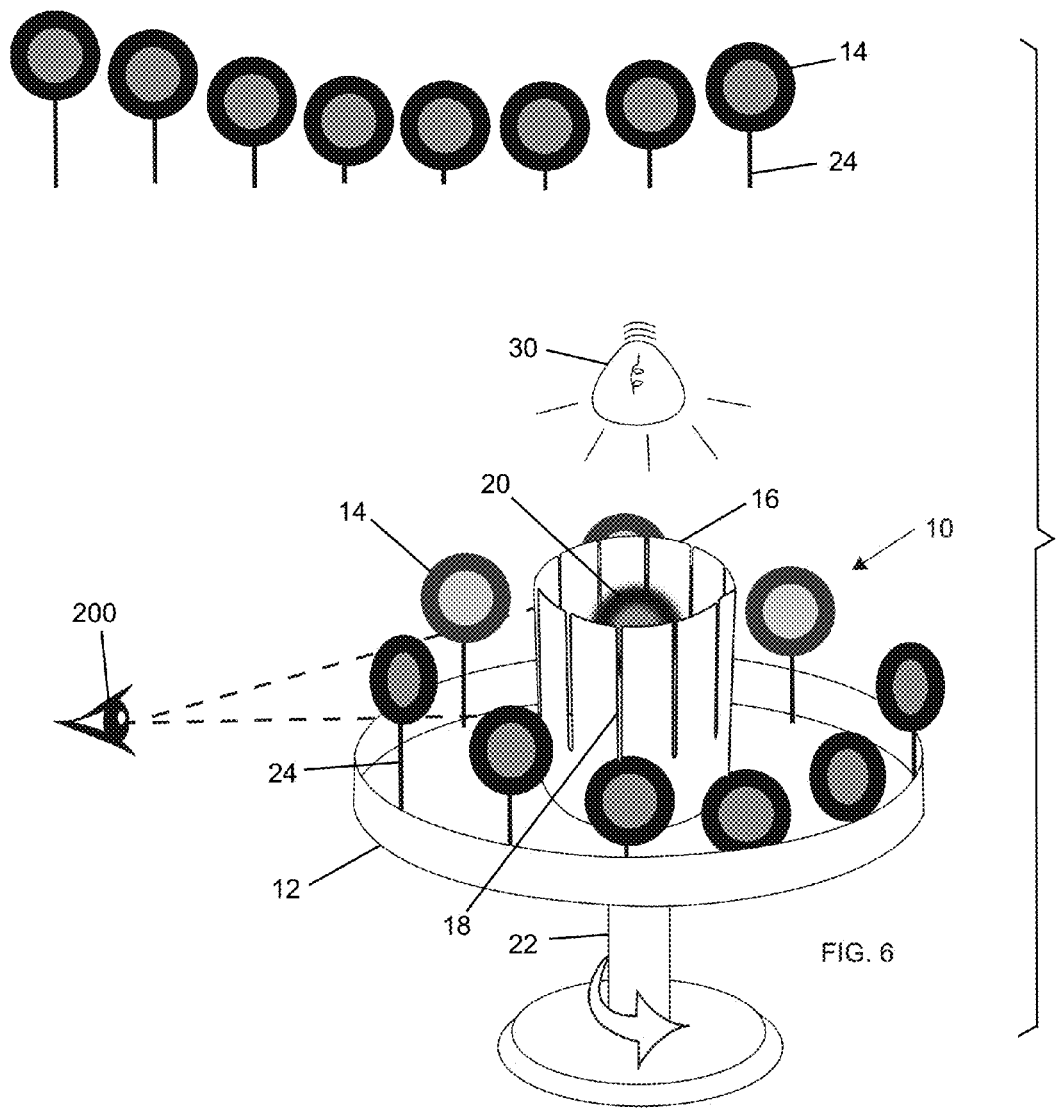
FIG. 6 is a perspective view of still another embodiment of the silhouette zoetrope with translucent colored elements.

As shown in FIG. 6, the silhouette zoetrope 10 could incorporate images 14 that can be sequentially disposed, even with those images 14 being substantially similar in shape and color or colors to one another. For instance, the images 14, which could again be retained by support members 24, could vary sequentially in position, such as along a longitudinal relative to the pivot axis of the zoetrope 10. The images 14 could be colored with one or more different colors. A translucent substrate may be used to form all or part of the images 14 to permit optimal color perception. So constructed, the silhouette zoetrope 10 can produce a moving, colored silhouette 20 when the platform 12 and the retained images 14 of the zoetrope 10 are rotated with the slotted cylinder 16. The images 14, which are disposed outside of the cylinder 16 along a circumference concentric with a circumference of the cylinder 16, are perceived as a moving silhouette 20 in color and appearing to move inside the cylinder 16 when perceived through the slots 18 in the cylinder 16 by an observer 200.

Figure 7:
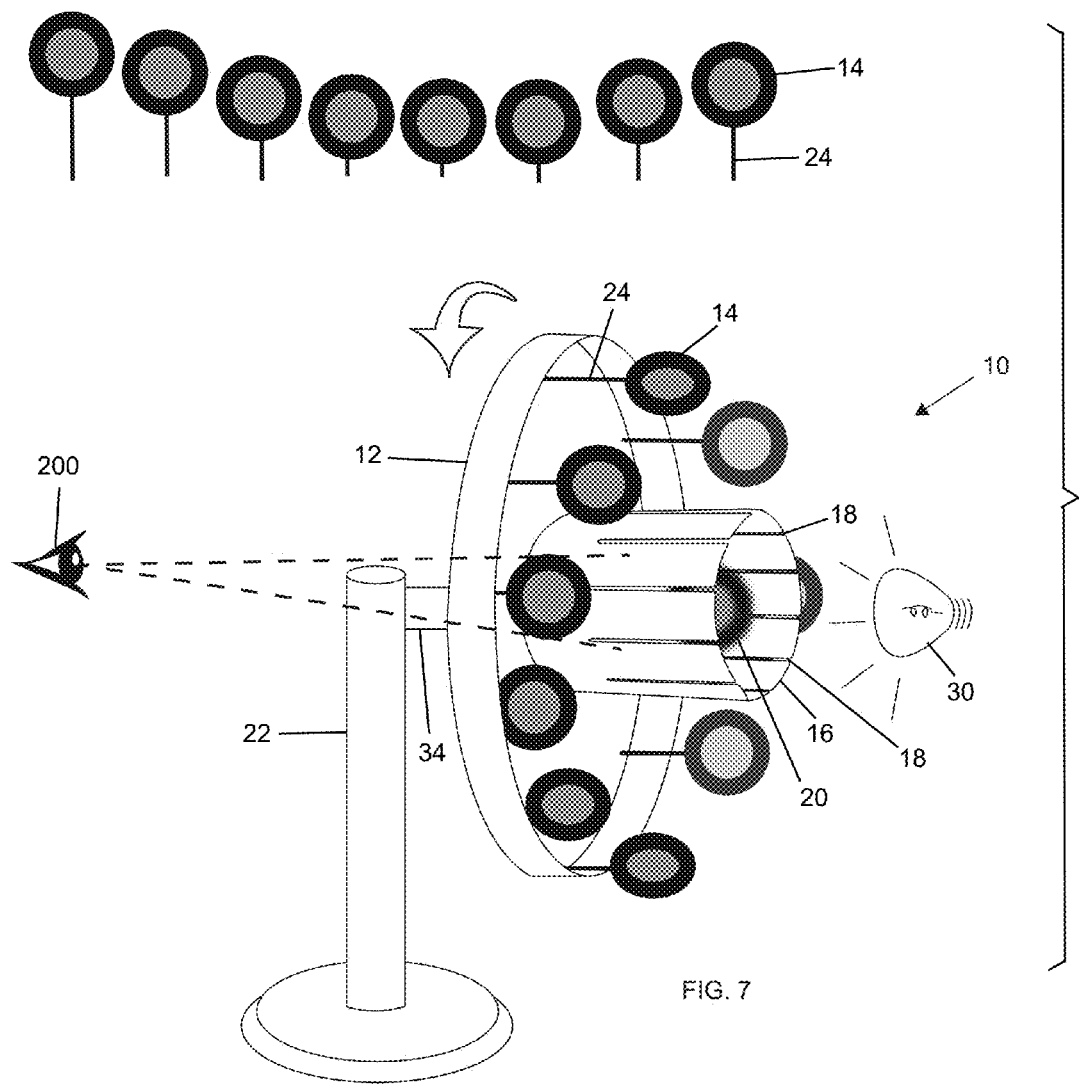
FIG. 7 is a perspective view of yet another silhouette zoetrope embodying the invention.

Even further, as shown in FIG. 7, embodiments of the silhouette zoetrope 10 are contemplated wherein animation effects can be perceived both inside and outside the cylinder 16. While it will be appreciated that the included images 14 could vary within the scope of the invention, the depicted images 14 comprise color images 14 sequentially positioned and retained by differently disposed posts 24 relative to a rotatable platform 12. The images 14 are disposed along a circumference, and a slotted cylinder 16 is disposed to rotate with the platform 12 concentric with the cylinder 16 and inboard thereof.

In the embodiment of FIG. 7, however, the platform 12 and the cylinder 16 are supported by a support stand 22 but are disposed for rotation about a horizontal axis 34. With that, the perception of color may be more evident as the silhouette 20 can now be perceived through the same slot 18 with both eyes of the observer 200. This occurs because each image 14 is now seen through the same slot 18 with both of the observer's eyes, which is understood to help the perception of the flickering effect of the zoetrope cylinder 16 as animated both inside and outside the cylinder 16.

Figure 8:
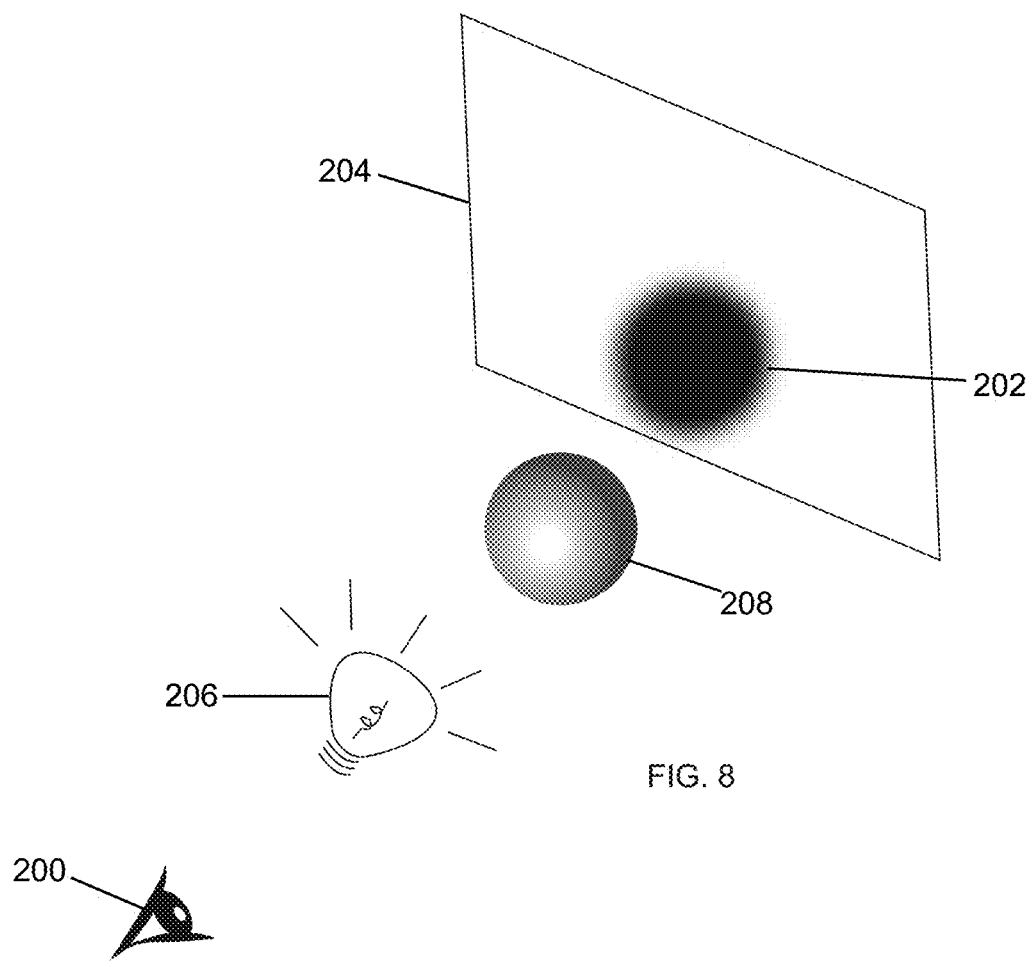
FIG. 8 is a schematic view depicting the creation of a shadow with a light source.
Figure 9:
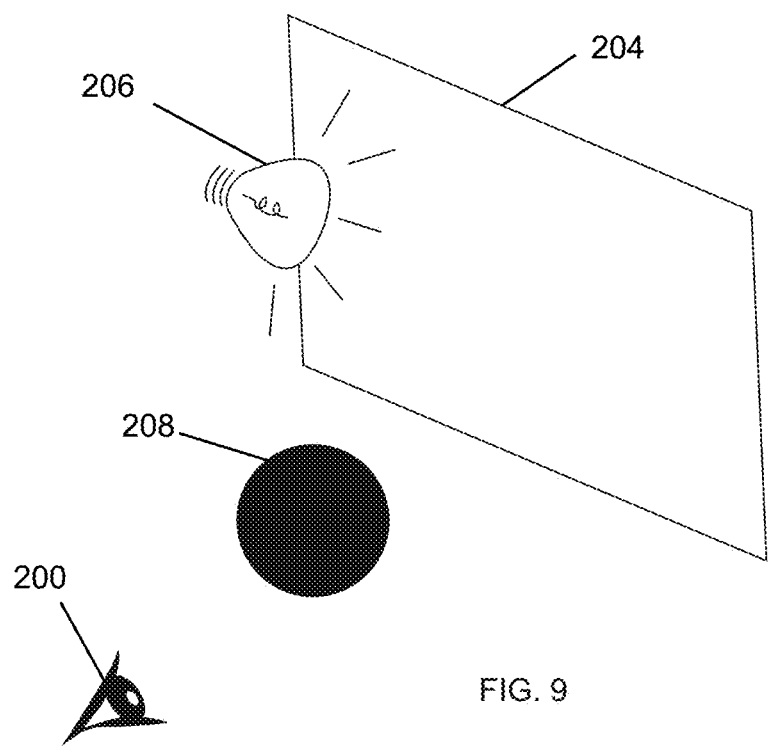
FIG. 9 is a schematic view depicting the creation of a silhouette with a light source.

A further understanding of the invention may be had with additional reference to FIGS. 8 and 9. FIG. 8 schematically depicts the perception by an observer 200 of a shadow 202 in relation to a background 204 or other surface with the illumination of a light source 206. In this regard, it will be noted that a shadow 202 is defined by the Merriam-Webster dictionary as "a dark shape that appears on a surface when someone or something moves between the surface and a source of light." It will be understood that an observer 100, plus a light source 106, plus an object 108, plus a background 104 will yield a shadow 102 on the background 104. A silhouette is, as defined by the Merriam-Webster dictionary, "someone or something appearing as a dark shape in front of a light background." As shown schematically in FIG. 9, such a silhouette is the result of an observer 200, plus an object 208, plus a light source 206, plus a background 204. Therefore, since the light source positioned atop of the silhouette zoetrope reinforces the resulting animated image, which characterizes a silhouette and not a shadow.

In embodiments of the silhouette zoetrope 10, the resulting moving silhouette 20 moves or appears to move inside the cylinder 16, visually apart from the original image 14. The precise phenomenon at play continues to be the subject of research and analysis, even by the present inventor. In that regard, it must be appreciated that the phenomenon perceived during animation of the silhouette zoetrope 10 may not be merely a silhouette under the traditional definition of the term; it may be something more. Bearing in mind that inventions are not created for words but words are created for inventions, the term silhouette as used herein should not be held to limit the structure or function of the protected invention but instead merely to provide a considered explanation for the phenomenon that yields the perception of an animated image or silhouette 20 within the slotted cylinder 16 as disclosed herein. The structure and operation of the disclosed zoetrope 10 produce the perception of an animated image, referred to herein as a silhouette 20, within the slotted cylinder 16 while the actual physical images 14 are disposed along a circumference surrounding the slotted cylinder 16. For the purposes of this disclosure, the term silhouette may be used with it being expressly noted that future experimentation and understanding may warrant a supplementation or modification of the description of the perceived moving image 20 presently given the moniker silhouette 20. At the time of the writing of the present disclosure, reference to the structure as a silhouette zoetrope 10 appears to be accurate for the additional reason that, when a light source 30 is illuminated from above the slotted cylinder 16, the spectral contrast effect is increased, and the moving image 20 is better seen. If the spectral image 20 were in fact a shadow, the light source 30 would tend to make it disappear and not reinforce it.

The present invention exploits the phenomena of shadow and silhouette to produce a silhouette zoetrope 10 that represents a paradigm shift from the prior art. Many systems and methods reproducing the results of a traditional zoetrope 100 may exist. However, since the first zoetrope patent in the early nineteenth century, no known proposals in the prior art create an animated effect to produce the perception of images 14, such as two-dimensional and three-dimensional objects, moving inside a cylinder 16 as silhouettes 20 creating a spectral effect. The present invention does so while, in disclosed embodiments, maintaining the structure of the slotted cylinder 16 with slits 18 from the traditional zoetrope 100. The traditional zoetrope cylinder 16 creates a flickering effect, thereby enabling perceived animation of the silhouette 20.

Commercial applications of the silhouette zoetrope 10 may range from large-scale theme park installation, artistic and animated installations in galleries, theaters and shopping mall displays, as well as interactive visual displays that can be actuated by the viewer, such as through direct contact and a rotation of the structure or by a motor, cranks and presence sensors. Horizontally spaced images and slotted structures may also embody the invention. For instance, with a lit background, a slotted wall, potentially with a transparent wall, with silhouette images in front that would remain still while observers travel past would produce an animated effect. Embodiments can also be produced on a smaller scale, such as in the form of a retail product sold to individuals as scientific toys. With the combination of multiple optical illusions in a single device, the disclosed silhouette zoetrope 10 may also help scientists and neuroscientists to better understand how the visual perception systems of humans work.

When applicable as a scientific toy, the silhouette zoetrope 10 has significant potential with numerous possibilities and variations being within the scope of the claimed invention. For instance, the structure of the zoetrope 10 could be produced through three-dimensional printing processes to be assembled, combined, and recombined by the individual. Moreover, combinations of the traditional zoetrope 100 and the silhouette zoetrope 10 could be created to combine different animated results, such as by using sequential drawings on a paper strip 106 and sequential two-dimensional or three-dimensional figures or other images 14.

It is also contemplated that manifestations of the silhouette zoetrope could exploit differently size platforms 12 and different two dimensional or three-dimensional objects or other images 14 to be selected and combined by the individual. Plural platforms 12 could rotate in the same or different directions, and the resulting animated effect would be perceived as multiple animated silhouettes 20 interacting inside the spinning slotted cylinder 16.

Still further, users could create their own two-dimensional or three-dimensional images 14, potentially through templates provided in toy packaging. Such potential applications combine science, creativity, education, and assembly skills while leaving users free to discover and create their own combinations while enjoying the animated illusion of the silhouette zoetrope 10.

It should be noted that certain elements in some of the figures may be omitted or illustrated not-to-scale. For illustrative clarity, cross-sectional views may be in the form of slices or near-sighted cross-sectional views, potentially omitting certain background portions that would otherwise be visible in a true cross-sectional view.

With certain details and embodiments of the present invention for a silhouette zoetrope 10 disclosed, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Accordingly, it will be clear that those with major features of the invention in mind could craft embodiments that incorporate those major features while not incorporating all of the features included in the preferred embodiments.

Therefore, the following claims shall be employed to protect this invention and shall define the scope of protection to be afforded to the inventor. Those claims shall be deemed to include equivalent constructions insofar as they do not depart from the spirit and scope of the invention. It must be further noted that a plurality of the following claims may express or be interpreted to express certain elements as means for performing a specific function, at times without the recital of structure or material. As the law demands, any such claims shall be construed to cover not only the corresponding structure and material expressly described in this specification but also all equivalents thereof.

I claim as deserving the protection of Letters Patent:

1. An animation device for producing the perception of animation within a slotted cylinder, the animation device comprising:
   a platform rotatable about a longitudinal axis of rotation;
   a slotted cylinder retained to rotate concentrically with the platform wherein the slotted cylinder has a peripheral wall with a circumference wherein a plurality of slots are disposed in the peripheral wall to form a plurality of wall segments separated by the plurality of slots; and
   a plurality of images retained to rotate with the platform wherein the plurality of images are disposed along a circumference substantially concentric with but greater than the circumference of the slotted cylinder whereby the slotted cylinder is disposed radially inward of the plurality of images;
   whereby, when the platform is rotated, an observer looking through the slots in the slotted cylinder can perceive an animation of the plurality of images within the slotted cylinder.

2. The animation device of claim 1 wherein the plurality of slots in the slotted cylinder are longitudinally disposed in the cylinder.

3. The animation device of claim 1 wherein the plurality of slots and the plurality of wall segments of the slotted cylinder are substantially evenly spaced.

4. The animation device of claim 1 wherein the plurality of images comprise two-dimensional or three-dimensional figures.

5. The animation device of claim 4 wherein each of the plurality of images is retained by an elongate support member with a proximal portion retained by the platform and a distal portion that retains an image from the plurality of images.

6. The animation device of claim 1 further comprising a support stand wherein the platform is rotatably retained by the support stand.

7. The animation device of claim 1 wherein the plurality of slots in the slotted cylinder and the plurality of images are equal in number.

8. The animation device of claim 1 wherein the slotted cylinder, the platform, and the images are rotatable as a unit.

9. The animation device of claim 1 wherein the slotted cylinder has a height greater than a height of each of the plurality of images relative to the platform.

10. The animation device of claim 1 wherein each of the plurality of figures is substantially aligned with one of the plurality of slots in the slotted cylinder.

11. The animation device of claim 1 wherein the plurality of figures are retained by an image cylinder disposed concentrically with the slotted cylinder and wherein the image cylinder has a circumference greater than the circumference of the slotted cylinder.

12. The animation device of claim 11 wherein the image cylinder is transparent.

13. The animation device of claim 1 wherein the plurality of images are sequential.

14. The animation device of claim 1 wherein there are first and second pluralities of images retained to rotate with the platform and wherein the first and second pluralities of images are separate, whereby, when the platform is rotated, an observer looking through the slots in the slotted cylinder can perceive an animation of the first plurality of images within the slotted cylinder and an animation of the second plurality of images within the slotted cylinder distinct from the animation of the first plurality of images.

15. The animation device of claim 14 wherein the first plurality of images are disposed along a first circumference and at least some of the second plurality of images are disposed along a second circumference different than the first circumference.

16. The animation device of claim 1 further comprising a background for being retained in the slotted cylinder.

17. The animation device of claim 16 wherein the background is disposed concentrically with the slotted cylinder.

18. The animation device of claim 1 wherein the plurality of images are disposed along a circumference of a circle with a diameter approximately equal to a diameter of the slotted cylinder plus a radius of the slotted cylinder.

19. The animation device of claim 1 wherein the slotted drum has an interior surface of a first color and wherein the slotted drum has an exterior surface of a second color and wherein the first and second colors contrast.

20. The animation device of claim 19 wherein the first color is substantially white and wherein the second color is substantially black.

* * * * *